(12) United States Patent
Liu et al.

(10) Patent No.: US 9,239,742 B2
(45) Date of Patent: Jan. 19, 2016

(54) EMBEDDED SYSTEMS AND METHODS FOR THREADS AND BUFFER MANAGEMENT THEREOF

(75) Inventors: Hsin-Yi Liu, Taichung (TW); Chih-Chiang Kao, Guishan Township, Taoyuan County (TW); Cheng-Hung Pan, Taipei (TW); Chun-Tai Yen, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 427 days.

(21) Appl. No.: 13/550,223

(22) Filed: Jul. 16, 2012

(65) Prior Publication Data

US 2013/0145372 A1 Jun. 6, 2013

(30) Foreign Application Priority Data

Dec. 1, 2011 (TW) .............................. 100144113 A

(51) Int. Cl.
*G06F 9/46* (2006.01)
*G06F 9/52* (2006.01)
*G06F 9/54* (2006.01)
*G06F 9/50* (2006.01)

(52) U.S. Cl.
CPC *G06F 9/52* (2013.01); *G06F 9/544* (2013.01); *G06F 9/50* (2013.01)

(58) Field of Classification Search
None
See application file for complete search history.

(56) References Cited

U.S. PATENT DOCUMENTS

| 7,765,547 | B2 * | 7/2010 | Cismas et al. | 718/100 |
|---|---|---|---|---|
| 8,407,714 | B2 * | 3/2013 | Gomyo et al. | 718/107 |
| 2006/0136915 | A1 * | 6/2006 | Aingaran et al. | 718/100 |
| 2010/0095306 | A1 * | 4/2010 | Gomyo et al. | 718/107 |
| 2011/0067034 | A1 * | 3/2011 | Kawamoto | 718/108 |
| 2011/0113220 | A1 * | 5/2011 | Morishita | 712/30 |
| 2011/0219382 | A1 * | 9/2011 | Hou | 718/104 |
| 2012/0036316 | A1 * | 2/2012 | Dowling | 711/105 |
| 2013/0191846 | A1 * | 7/2013 | Kumura | 718/106 |

* cited by examiner

*Primary Examiner* — Kenneth Tang
(74) *Attorney, Agent, or Firm* — McClure, Qualey & Rodack, LLP

(57) ABSTRACT

Embedded systems are provided, which includes a processing unit and a memory. The processing unit simultaneously executes first thread having a flag for performing a data acquisition operation and second thread for performing a data process and output operation for the acquired data in the data acquisition operation. The flag is used for indicating whether a state of the first thread is in an execution state or a sleep state. The memory which is coupled to the processing unit provides a shared buffer for the first and second threads. Before executing the second thread, the flag is checked to determine whether to execute the second thread, wherein the second thread is executed when the flag indicates the sleep state while execution of the second thread is suspended when the flag indicates the execution state.

9 Claims, 4 Drawing Sheets

EMBEDDED SYSTEMS AND METHODS FOR THREADS AND BUFFER MANAGEMENT THEREOF

CROSS REFERENCE TO RELATED APPLICATIONS

This Application claims priority of Taiwan Application No. 100144113, filed on Dec. 1, 2011, and the entirety of which is incorporated by reference herein.

BACKGROUND OF THE INVENTION

1. Field of the Invention

The disclosure relates generally to embedded systems and methods for thread and buffer management thereof, and, more particularly to embedded systems and methods for threads and buffer management thereof capable of simultaneously processing multiple threads.

2. Description of the Related Art

Embedded systems have been widely implemented in various fields, such as machine controllers, set-top boxes of tool machines, information home appliances, mobile phones, trip computers and so on. The embedded system is mainly used for remote controlling and data acquisition to perform remote monitoring of the tool machine and frequency diagnosis operation of the tool machine in the case of a set-top box for the tool machine. Generally, when the tool machine performs the frequency diagnosis operation, the set-top box of the tool machine should keep in high speed and stable acquiring frequency for acquiring data from the tool machine. The acquired data is processed first and the processed data is transmitted to the remote side. If the acquiring frequency of data is not stable during the data acquisition operation (i.e. the data can not be acquired at a stable frequency), misjudgment may be caused due to the insufficiency of the acquired data. However, due to the cost consideration, the embedded system is typically composed of a cheap central processing unit (CPU), thus its operation capability may be limited. When the processing unit of the embedded system requires to acquire data, process the acquired data and output the processed data simultaneously, the processing unit may not be capable of executing the thread, which requires to acquire data on time, in time to acquire data on schedule due to the limited operation capability of the processing unit and/or previously acquired data may not be processed on time leading to out of the memory. Then, the acquiring will be delayed and stability of signal acquiring will be affected.

Recently, with the growths in computer techniques and processor architectures advance, processors with multi-cores have become more and more popular. The multi-core indicates a technology that implements concurrent processing of multiple threads at the same time on hardware. Due to the better performance and the well hardware support of the multi-core processor, the processing/computer systems with the multi-core processor can execute more than one thread at the same time so as to improve overall processing performance. Due to the cost consideration, the embedded system adapting a single-core processor is generally used and the single-core is utilized to simultaneously perform the data acquisition and data process operations. To prevent the acquiring frequency from being affected by real time diagnosis processing, producer and consumer modes are utilized to separately perform the data acquisition operation by one thread (i.e. the producer) and perform the data process operation by another thread (i.e. the consumer) so as to avoid interference and waiting between each other. However, although the data acquisition and data process operations can be separated by using different threads, the execution order between the two types of threads can not be controlled by the processor since the execution order still follows the sequence scheduled by the operation system (OS). Thus, stability of data acquisition (i.e. stably acquiring data on schedule) may not be guaranteed when the processor and memory loading in the embedded system is almost full. In addition, a shared memory (also referred to as shared buffer) is utilized to be accessed by different threads. Since the storage space of the shared memory (buffer) is limited, it may easily become out of memory after a long time operation, thereby resulting in data loss.

It is therefore a desire to provide a method for threads control and buffer management for use in the embedded system that may, under a condition that the hardware cost for the embedded system is not significantly increased and the specifications of the processor and the memory within the embedded system are not enhanced, keep acquiring data with high frequency and performing data process and output operation at the same time without the drawbacks of acquiring data with unstable acquiring frequency and resulting in data loss due to the problems of insufficient spaces of the memory buffer.

BRIEF SUMMARY OF THE INVENTION

Embedded systems and methods for thread and buffer management thereof are provided.

An embodiment of an embedded system includes a processing unit and a memory. The processing unit simultaneously executes first thread having a flag for performing a data acquisition operation and second thread for performing a data process and output operation for the acquired data in the data acquisition operation. The flag is used for indicating whether a state of the first thread is in an execution state or a sleep state. The memory is coupled to the processing unit for providing a shared buffer for the first and second threads. Before the processing unit executes the second thread, the flag is checked to determine whether to execute the second thread, wherein the second thread is executed when the flag indicates the sleep state while execution of the second thread is suspended when the flag indicates the execution state.

In another embodiment, a method for thread and buffer management for use in an embedded system is provided, wherein the embedded system simultaneously executes at least one first thread for performing a data acquisition operation and one second thread for performing a data process and output operation for the acquired data in the data acquisition operation, wherein a shared buffer is provided to the first and second threads. The method comprising the steps of providing the first thread a flag for indicating that a state of the first thread is in one of an execution state and a sleep state, and before executing the second thread, checking the flag to determine whether to execute the second thread, wherein the second thread is executed when the flag indicates the sleep state while execution of the second thread is suspended when the flag indicates the execution state.

In some embodiments, a timer is further provided to record next execution time for the first thread. The processing unit further executes the first thread and sets the flag to indicate the execution state according to the next execution time for the first thread recorded by the timer while the processing unit sets the flag to indicate the sleep state and updates the next execution time for the first thread recorded by the timer after the execution of the first thread is finished.

In some embodiments, a bus and a integrated circuit for buffer management are further provided, wherein the integrated circuit for buffer management is coupled to the memory and the processing unit through the bus for accessing the shared buffer, acquiring data from the shared buffer and writing the acquired data to an external storage unit, and acquiring data from the external storage unit and writing the data acquired from the external storage unit to the shared buffer.

Methods for thread and buffer management thereof may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Embedded systems and methods for thread and buffer management thereof are provided. High frequency acquisition of external signals, data process and output the processed data can be executed continually for the embedded system in the invention (e.g. the set-top boxes of the tool machines) without adding hardware costs, such as the processing unit (e.g. CPU)/memory, in the embedded systems, thereby providing stable acquiring frequency.

Figure 1:
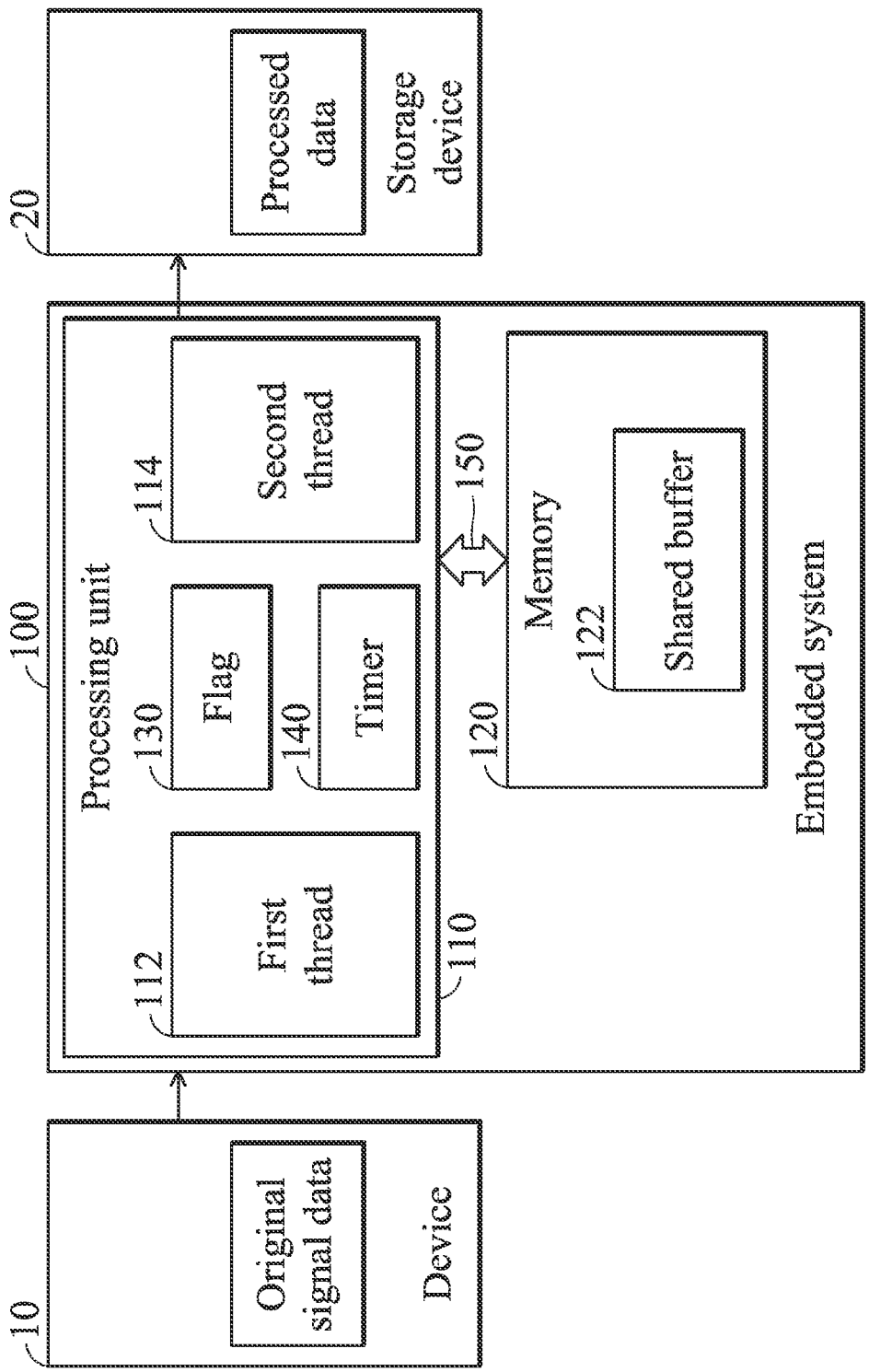
FIG. 1 is a schematic diagram illustrating an embodiment of an embedded system of the invention.

FIG. 1 is a schematic diagram illustrating an embodiment of an embedded system 100 of the invention. For example, the embedded system 100 may be a set-top box of a tool machine, however, it is to be understood that the invention is not limited thereto. The embedded system 100 mainly comprises a processing unit 110, a memory 120, and a flag 130. The processing unit 110 can process multiple threads and can execute at least one first thread 112 and one second thread 114 at the same time. The first thread 112 is used for performing a data acquisition operation, such as acquiring signals or information from an external device 10 (e.g. a tool machine, a testing machine or a monitoring equipment). The second thread 114 is used for performing a data process and output operation for the data acquired by the first thread 112 and then outputting the processed data to a storage device 20 (e.g. a hard disk, a remote host, a database or the likes). In general, because the data acquired by the first thread 112 cannot be processed by the second thread 114 in time, the unprocessed data is not suitable for transmitting to the remote host directly. It is better to firstly perform a data process operation on the acquired data in the data acquisition operation and then output the processed data to a storage device. The data process operation may be an normalization process, an averaging process, a sorting and filtering process, a preliminary analysis process and so on.

The memory 120 is coupled to the processing unit 110 through a bus 150 to provide a shared buffer 122 for the first thread 112 and the second thread 114. The bus 150 may be any commonly used bus architectures, such as a PCI bus, an ISA bus or the like. In other words, the first thread 112 may write the acquired data to the shared buffer 122 and the second thread 114 may read the written data from the shared buffer 122 to perform the data process and output operation. The flag 130 is used for indicating that a current state of the first thread 112 is in which one of an execution state and a sleep state. That is, the flag 310 is mainly used for indicating the first thread 112 is in the execution state or the sleep state.

Before executing the second thread 114 to perform the data process and output operation, the processing unit 110 first checks the flag 130 to determine whether to execute the second thread 114. When the flag 130 indicates the sleep state, the processing unit 110 determines to execute the second thread 114 while the processing unit 110 determines to suspend the execution of the second thread 114 when the flag indicates the execution state.

Moreover, the embedded system 100 further comprises a timer 140, which records next execution time for the first thread 112. In this embodiment, the flag 130 and the timer 140 are set within the processing unit 110. In another embodiment, the flag 130 and the timer 140 may be designated as hardware and/or firmware components independent from the processing unit 110.

In the embodiment that the embedded system 100 has the timer 140, the processing unit 110 executes the first thread 112 and sets the flag 130 to indicate the execution state according to the next execution time for the first thread 112 recorded by the timer 140. After the execution of the first thread 112 is finished, the processing unit 110 sets the flag 130 to indicate the sleep state and updates the next execution time for the first thread 112 recorded by the timer 140. To be more specific, every time before the second thread 114 being executed, the processing unit 110 first checks the current state of the first thread 112, i.e. by checking the flag 130. When the state of the first thread 112 is in the execution state, the flag 130 is set to indicate the execution state and the execution of the second thread is suspended until the execution of the first thread 112 is finished. In this case, the processing unit 110 only executes the second thread when the flag 130 is changed to the sleep state. Contrarily, when the state of the first thread 112 is in the sleep state, the flag 130 is set to indicate the sleep state and the processing unit 110 executes the second thread 114 until next execution time for the first thread 112 is reached. The processing unit 110 may determine the current state of the first thread 112 according to the flag 130 and may further determine the next execution time for the first thread 112 by the timer 140.

The flag 130 may be set by the first thread 112 based on its current state (e.g. the flag 130 is set to be 1 if the first thread 112 is in the execution state and the flag 130 is set to be 0 if it is in the sleep state). When the current state of the first thread 112 is in the execution state, the flag 130 is set to be 1 for indicating an execution state. When the execution of the first thread 112 is finished, i.e. the current state is changed from the execution state to the sleep state, the flag 130 is cleared (the flag 130 is set to be 0) for indicating a sleep state and the next execution time for the first thread 112 recorded by the timer 140 is updated at the same time. The next execution time for the first thread 112 may be determined based on predetermined acquiring frequency, thus ensuring that the embedded system 100 can stably acquire data according to the predetermined acquiring frequency. The responsive method for thread management of the embedded system 100 will be discussed further in the following paragraphs.

Figure 2:
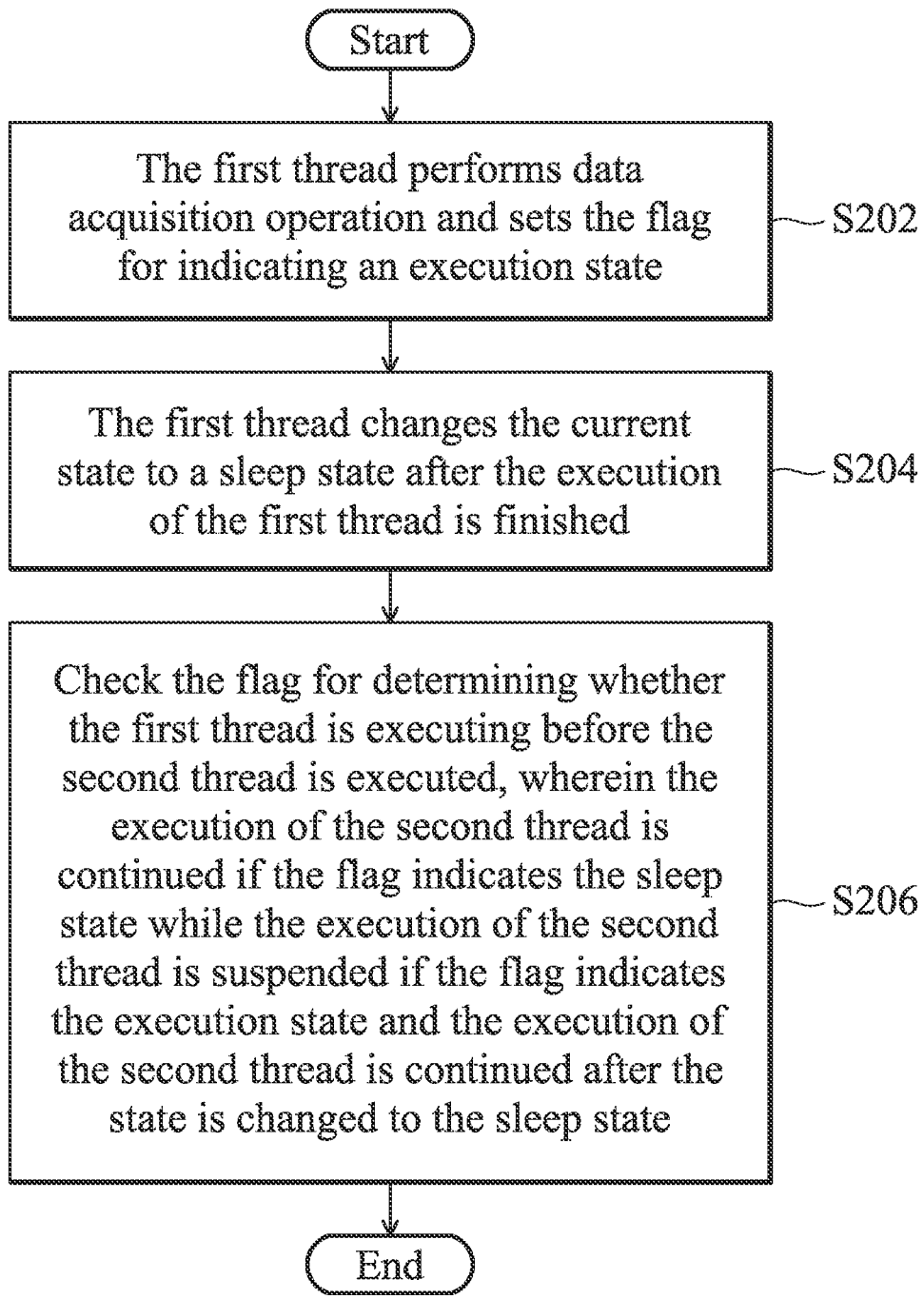
FIG. 2 is a flowchart of an embodiment of a method for thread and buffer management for use in the embedded system of the invention for performing a data acquisition operation.

FIG. 2 is a flowchart of an embodiment of a method for thread and buffer management used in an embedded system of the invention, wherein the embedded system simultaneously executes at least one first thread and one second thread. The first thread performs a data acquisition operation and the second thread performs a data process and output operation for the acquired data in the data acquisition operation. In this embodiment, following steps are performed by the processing unit according to the threads. Please refer together to FIGS. 1 and 2. Wherein, the flag 130 is used for indicating that a current state of the first thread 112. In this embodiment, it is assumed that both the timer 140 and flag 130 are set to be 0 at initial. First, the data acquisition operation is executed by the first thread 112. When the current state of the first thread 112 is in an execution state, the first thread 112 sets the flag 130 (e.g. set the flag 130 to be 1) for indicating the execution state and starts performing the data acquisition operation, which acquires data from the external device 10 (step S202). Thereafter, after the execution of the first thread 112 is finished, the first thread 112 changes the current state to a sleep state, e.g. the first thread 112 resets the flag configuration (such as sets the flag 130 to be 0) (step S204). In another embodiment, the value of the timer 140 may be updated at the same time when the current state is changed to the sleep state such that the first thread 112 may perform next execution according to the value of the timer 140 (further in step S204). In this embodiment, the value of the timer 140 may be updated through the first thread 112, wherein the value of the timer 140 indicates next execution time for the first thread 112, which may be determined by predetermined acquiring frequency. Thereafter, the flag 130 is checked for determining whether the first thread 112 is executing before the second thread 114 is executed. The execution of the second thread 114 is continued (i.e. the data process operation is executed) if the flag 310 indicates the sleep mode while the execution of the second thread 114 is suspended if the flag 130 indicates the execution state and the execution of the second thread 114 is continued after the state is changed to the sleep state (step S206).

Figure 3:
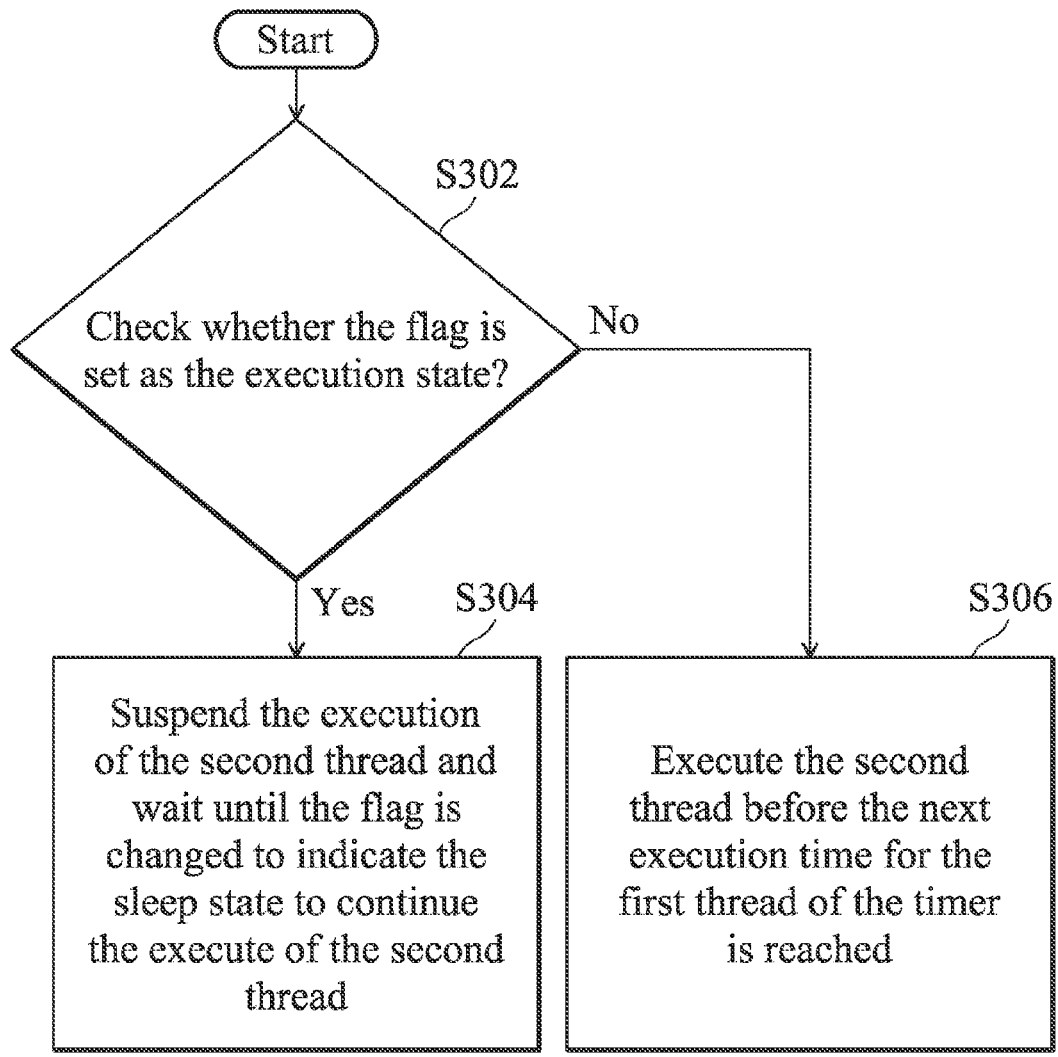
FIG. 3 is a flowchart of another embodiment of a method for thread and buffer management for use in the embedded system of the invention for performing a data diagnosis process and output operation.

FIG. 3 is a flowchart of another embodiment of a method for thread and buffer management for use in an embedded system of the invention. Please refer together to FIGS. 1 and 3. The processing unit 110 may execute the second thread 114 to perform a data process and output operation. The embodiment can be applied to the embedded system which simultaneously executes at least one first thread and one second thread. The first thread performs a data acquisition operation, and the second thread performs a data process and output operation for the acquired data. In this embodiment, following steps are performed by the processing unit directly. First, before the processing unit 110 executes the second thread 114 to perform the data process and output operation, the processing unit 110 checks whether the flag 130 is set as the execution state (step S302). The processing unit 110 may obtain the current state of the first thread 112 through the flag 130. When the flag 130 is set to indicate the execution state (i.e. the flag is set to be 1, Yes in step S302), the processing unit 110 suspends the execution of the second thread 114 and waits until the flag 130 is changed to indicate the sleep state. Therefore, the execution of the second thread 114 is performed only when the execution of the first thread 112 is finished (step S304).

Contrarily, when the flag 130 is set to indicate the sleep state (e.g. the flag is set to be 0, No in step S302), which indicates that the state of the first thread 112 is the sleep state, the processing unit 110 executes the second thread 114. Further in another embodiment, in order to ensure that the first thread 112 can be executed on schedule in this step, the processing unit 110 executes the second thread 114 before the next execution time for the first thread 112 of the timer 140 is reached (step S306). In this step, the processing unit 110 may obtain current state of the first thread 112 according to the set state of the flag 130 and may further obtain the next execution time for the first thread 112 from the timer 140.

Because the processing unit 110 will obtain the state of the first thread 112 by the flag 130 and the timer 140 prior to every execution of the second thread 114 and the execution of the second thread 114 is performed only when the first thread 112 does not request for execution. It is ensured that the acquiring frequency for the first thread 112 which is in charge of the data acquisition operation can be stable and the execution of the first thread 112 is not being interrupted.

In one embodiment, a thread development kit may further be provided to perform the aforementioned data acquisition operation and data process and output operation as shown in FIGS. 2 and 3, respectively. This thread development kit can be applied on any embedded system that does not support the described thread management method. When the thread development kit is installed onto the embedded system that does not support the described thread management method, the described data acquisition operation and data process and output operation as shown in FIGS. 2 and 3 can be achieved by registering the first thread, registering the second thread, and configuring the execution frequency for the first thread to provide the described flag and timer to the first thread.

In some embodiments, buffer management hardware and an external storage unit can further be provided to provide more buffer storage spaces to solve the problem of the insufficient spaces of the shared memory. Please refer to FIG. 4.

Figure 4:
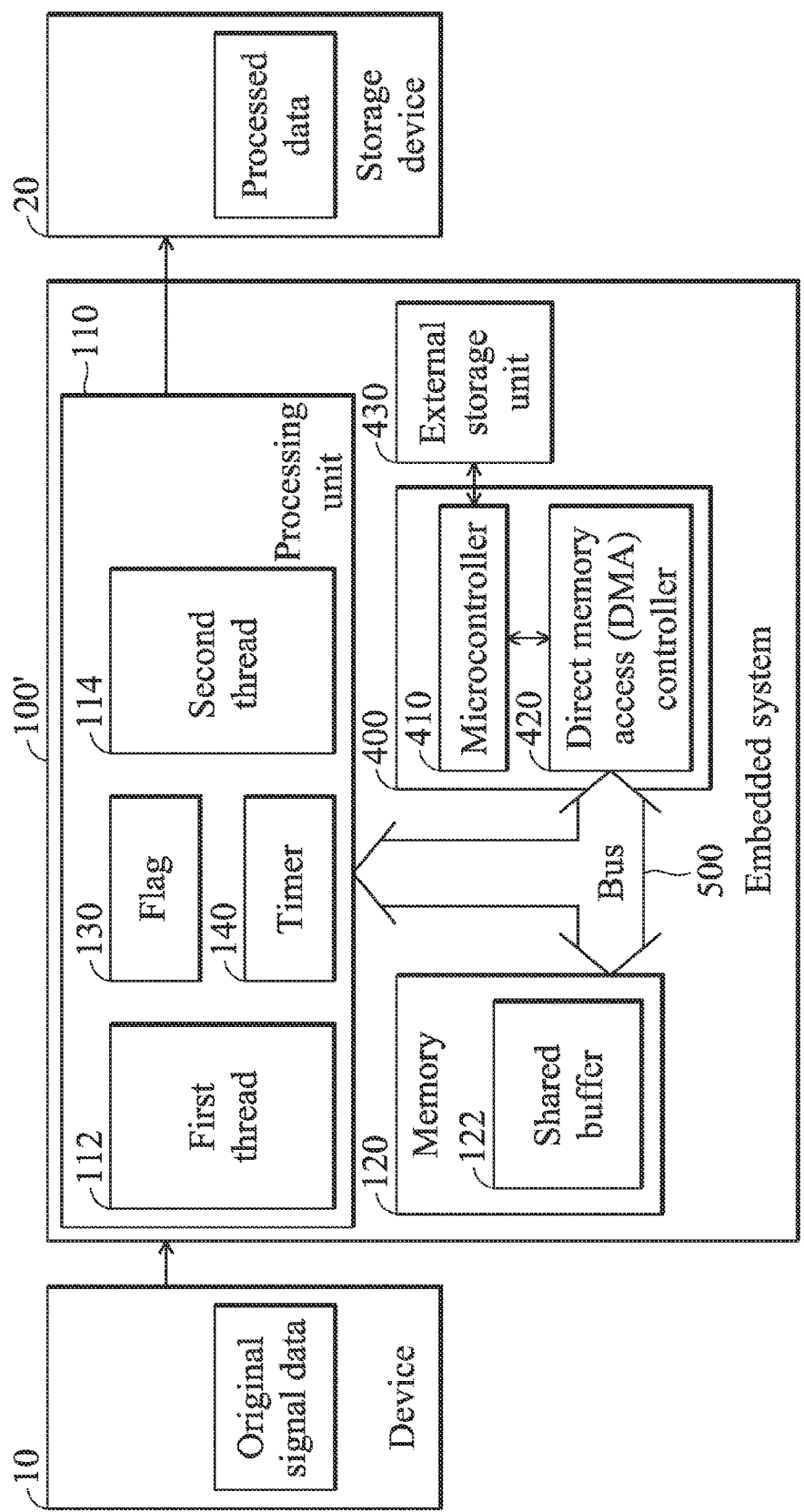
FIG. 4 is a schematic diagram illustrating another embodiment of an embedded system of the invention.

FIG. 4 is a schematic diagram illustrating another embodiment of an embedded system 100' of the invention. The embedded system 100' shown in FIG. 4 is similar to the embedded system 100 shown in FIG. 1, excepting that a integrated circuit for buffer management 400 capable of managing the shared buffer and an external storage unit 430 are added to the embedded system 100'.

The integrated circuit for buffer management 400 at least comprises a microcontroller (MCU) 410 and a direct memory access controller (DMA controller) 420. The external storage unit 430 may be a flash memory or the original storage device 20. In another embodiment, the external storage unit 430 and the integrated circuit for buffer management 400 may be integrated into a hardware kit. The integrated circuit for buffer management 400 may connect to the processing unit 110 and the memory 120 within the motherboard of the embedded system 100 through a bus 500 and synchronizes data between the shared buffer 122 within the memory 120 and the external storage unit 430. The bus 500 may be any commonly used bus architectures, such as a PCI bus, an ISA bus or the like. To be more specific, the microcontroller 410 may be a specific integrated circuit (IC) chip which can be regard as a microcomputer such as the CPU, memory, timer/counter, input/output interfaces and so on are integrated into a single IC chip. Compared with the general microcontroller applied in the personal computer (PC), the microcontroller 410 can save more hardware cost. The largest benefits of the microcontroller 410 are that it has small size and high integration capability, but it has small storage capability, simple input/output interfaces and lower functionality.

The DMA controller 420 may perform a DMA operation to allow direct data transfer between the integrated circuit for buffer management 400 and the memory 120 without the processing unit 110. When a large amount of data transfers among the peripheral devices and the memory is required, the DMA operation can be performed by hardware directly without interrupting program running, thus saving more time. The DMA controller 420 may generate an operation signal according to a usage status of the shared buffer 122 and perform a DMA operation on the shared buffer 122 through the bus 500, wherein the operation signal may be a data acquisition signal or a data storing signal. The microcontroller 410 is coupled to the DMA controller 420 and the external storage unit 430 (such as the flash memory, the external memory card or other storable external storage devices) for accessing the external storage unit 430 in response to the operation signal generated by the DMA controller 420. When the operation signal is a data acquisition signal, the DMA operation is for acquiring data from the shared buffer 122 and the microcontroller 410 writes the data acquired from the shared buffer 122 to the external storage unit 430. When the operation signal is a data storing signal, the microcontroller 410 acquires data from the external storage unit 430 and the DMA operation is for writing the data acquired from the external storage unit 430 to the shared buffer 122. Note that the shared buffer 122 and the external storage unit 430 are updated simultaneously and the microcontroller 410 further records information regarding where to store the moved data block in the external storage unit 430 and information regarding where to move the data block in the external storage unit 430.

In addition, the shared buffer 122 is further divided into a first buffer regarding as a buffer of the first thread 112 and a second buffer regarding as a buffer of the second thread 114. In one embodiment, the first thread 112 further includes a plurality of blocks and the second thread 114 further includes a plurality of blocks. In this embodiment, when the usage status of the shared buffer 122 indicates that one dedicated block of the blocks within the first thread 112 is full, the DMA controller 420 generates the data acquisition signal and acquires data from the first thread 112 and the microcontroller 410 writes the data acquired from the first thread 112 to the external storage unit 430. When the usage status of the shared buffer 122 indicates that one dedicated block of the blocks within the second thread 114 is empty, the DMA controller 420 generates the data acquisition signal such that the microcontroller 410 acquires data from the external storage unit 430, and the DMA controller 420 then writes the data acquired from the external storage unit 430 to the second thread 114. To be more specific, when one dedicated memory block of the blocks within the first thread 112 is full, the processing unit 110 triggers a data acquisition signal to inform the DMA controller 420 to perform a data movement operation and writes data to next block. Meanwhile, the DMA controller 420 moves whole memory block to the microcontroller 410 via the bus 500 and then the microcontroller 410 writes the moved memory block to the external storage unit 430. When one dedicated memory block of the blocks within the second thread 114 is empty, the processing unit 110 triggers a data storing signal to inform the DMA controller 420 to perform a data movement operation and reads data from next block. Meanwhile, the DMA controller 420 may recognize that the memory block is empty through the bus 500 and inform the microcontroller 410 so that the microcontroller 410 reads a dedicated memory block from the external storage unit 430, and then moves the read dedicated memory block to the DMA controller 420. The DMA controller 420 then writes the read dedicated memory block to the memory 120 via the bus 500.

In another embodiment, triggering of the data acquisition signal and the data storing signal to perform the data movement may be determined according to the usage ratio for the first thread 112 and the usage ratio for the second thread 114. For example, when the usage status of the shared buffer 122 indicates that the usage of the first thread 112 has exceeded a dedicated ratio for the first thread 112 (e.g. 80%), the DMA controller 420 generates the data acquisition signal and acquires data from the first thread 112 and then the microcontroller 410 writes the acquired data of the first thread 112 to the external storage unit 430. When the usage status of the shared buffer 122 indicates that the usage of the second thread 114 has lower than a dedicated ratio for the second thread 114 (e.g. 50%), the DMA controller 420 generates the data storing signal and the microcontroller 410 acquires data from the external storage unit 430, and then the DMA controller 420 writes the data acquired from the external storage unit 430 to the second thread 114. Triggering of the data acquisition signal and the data storing signal may be performed by the processing unit 110 or other designated hardware or firmware components which are independent from the processing unit 110 and it is determined whether to trigger the data acquisition signal and the data storing signal by periodically detecting and monitoring the usage ratios for the first thread 112 and the second thread 114.

In another embodiment, a buffer development kit which includes the integrated circuit for buffer management 400 as shown in FIG. 4 may further be provided to perform the aforementioned buffer management operation. This buffer development kit can be applied on any embedded system that does not support the described buffer management method. When the buffer development kit is installed onto the embedded system that does not support the described buffer management method, the described buffer management operation can be achieved by installing the buffer development kit through the bus, configuring the address of the shared memory (i.e. the address of the shared buffer) and installing an expanded flash memory.

Therefore, the embedded systems and methods for thread and buffer management thereof of the invention can process data using multiple threads and a timer and a flag are added into the thread which is responsible for data acquisition to ensure that the thread which is responsible for data acquisition can be first executed, thus preventing the data read and process operation and the writing operation from being mutual interference and providing stable and high data acquisition frequency. Furthermore, the embedded systems and methods for thread and buffer management thereof of the invention can use the DMA operation to quickly map the shared memory and use the independent microcontroller to store the shared memory to externally expand buffer spaces such as a flash memory, thus, efficiently avoiding the problems of insufficient spaces of the memory.

Methods for thread and buffer management, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. An embedded system, comprising:
a processing unit, simultaneously executing at least one first thread having a flag for performing a data acquisition operation and one second thread for performing a data process and output operation for acquired data in the data acquisition operation, wherein the flag is used for indicating that a state of the first thread is in one of an execution state and a sleep state;
a memory coupled to the processing unit, providing a shared buffer for the at least one first thread and the second thread;
a bus; and
an integrated circuit for buffer management coupled to the memory and the processing unit through the bus, accessing the shared buffer, acquiring data from the shared buffer and writing the acquired data in the data acquisition operation to an external storage unit, and acquiring data from the external storage unit and writing the data acquired from the external storage unit to the shared buffer,
wherein, the processing unit checks the flag before executing the second thread, wherein the second thread is executed when the flag indicates the sleep state while execution of the second thread is suspended when the flag indicates the execution state,
wherein the integrated circuit for buffer management further comprises:
a direct memory access (DMA) controller, generating an operation signal according to a usage status of the shared buffer and performing a DMA operation on the shared buffer through the bus; and
a microcontroller coupled to the DMA controller and the external storage unit, accessing the external storage unit according to the operation signal;
wherein the DMA operation is for acquiring data from the shared buffer and the microcontroller writes the data acquired from the shared buffer to the external storage unit when the operation signal is a data acquisition signal; and the DMA operation is for acquiring data from the external storage unit and the microcontroller writes the data acquired from the external storage unit to the shared buffer when the operation signal is a data storing signal, and
wherein the shared buffer is further divided into a first buffer regarding as a buffer of the first thread and a second buffer regarding as a buffer of the second thread and when the usage status of the shared buffer indicates that the usage of the first buffer has exceeded a dedicated ratio for the first buffer, the DMA controller generates the data acquisition signal and acquires the data of the first buffer and the microcontroller writes the acquired data of the first buffer to the external storage unit; and when the usage status of the shared buffer indicates that the usage of the second buffer has lower than a dedicated ratio for the second buffer, the DMA controller generates the data storing signal and the microcontroller acquires data from the external storage unit, and the DMA controller writes the data acquired from the external storage unit to the second buffer.

2. The embedded system of claim 1, further comprising:
a timer, recording next execution time for the first thread;
wherein the processing unit executes the first thread and sets the flag to indicate the execution state according to the next execution time for the first thread recorded by the timer while the processing unit sets the flag to indicate the sleep state and updates the next execution time for the first thread recorded by the timer after the execution of the first thread is finished.

3. The embedded system of claim 2, wherein the processing unit further executes the second thread until next execution time for the first thread of the timer is reached when the flag indicates the sleep state.

4. The embedded system of claim 1, wherein when the flag indicates the execution state and the execution of the second thread is suspended, the processing unit further returns to execute the second thread when the flag is changed to the sleep state.

5. The embedded system of claim 1, wherein the first buffer further includes a plurality of blocks and the second buffer further includes a plurality of blocks, wherein when the usage status of the shared buffer indicates that one dedicated block of the blocks within the first buffer is full, the DMA controller generates the data acquisition signal and acquires data from the first buffer and the microcontroller writes the data acquired from the first buffer to the external storage unit; and when the usage status of the shared buffer indicates that one dedicated block of the blocks within the second buffer is empty, the DMA controller generates the data acquisition signal and the microcontroller acquires data from the external storage unit, and the DMA controller writes the data acquired from the external storage unit to the second buffer.

6. A method for thread and buffer management for use in an embedded system, wherein the embedded system simultaneously executes at least one first thread for performing a data acquisition operation and one second thread for performing a data process and output operation for the acquired data in the data acquisition operation, wherein a shared buffer is provided to the first and second threads, the method comprising:
providing the first thread a flag for indicating that a state of the first thread is in one of an execution state and a sleep state; and
checking the flag before executing the second thread, wherein the second thread is executed when the flag indicates the sleep state while execution of the second thread is suspended when the flag indicates the execution state,
wherein the embedded system further includes a integrated circuit for buffer management and an external storage unit, and the method further comprises:
accessing, by the integrated circuit for buffer management, the shared buffer, acquiring data from the shared buffer and writing the acquired data in the data acquisition operation to the external storage unit, and acquiring data from the external storage unit and writing the data acquired from the external storage unit to the shared buffer, wherein the step of accessing, by the integrated circuit for buffer management, the shared buffer further comprises:

generating an operation signal according to a usage status of the shared buffer and performing a DMA operation on the shared buffer through the bus, thereby accessing the external storage unit according to the operation signal;

wherein the DMA operation is for acquiring data from the shared buffer and writing the data acquired from the shared buffer to the external storage unit through the bus when the operation signal is a data acquisition signal; and the DMA operation is for acquiring data from the external storage unit and writing the data acquired from the external storage unit to the shared buffer when the operation signal is a data storing signal; and wherein the shared buffer is further divided into a first buffer regarding as a buffer of the first thread and a second buffer regarding as a buffer of the second thread and when the usage status of the shared buffer indicates that the usage of the first buffer has exceeded a dedicated ratio for the first buffer, the DMA controller generates the data acquisition signal and acquires the data of the first buffer and the microcontroller writes the acquired data of the first buffer to the external storage unit; and when the usage status of the shared buffer indicates that the usage of the second buffer has lower than a dedicated ratio for the second buffer, the DMA controller generates the data storing signal and the microcontroller acquires data from the external storage unit, and the DMA controller writes the data acquired from the external storage unit to the second buffer.

7. The method of claim 6, further comprising:
providing a timer for recording next execution time for the first thread;
executing the first thread and setting the flag to indicate the execution state according to the next execution time for the first thread recorded by the timer; and
setting the flag to indicate the sleep state and updating the next execution time for the first thread recorded by the timer after the execution of the first thread is finished.

8. The method of claim 7, wherein the step of checking the flag to determine whether to execute the second thread further comprises:
executing the second thread until next execution time for the first thread of the timer is reached when the flag indicates the sleep state.

9. The method of claim 6, wherein the step of checking the flag to determine whether to execute the second thread further comprises:
when the flag indicates the execution state and the execution of the second thread is suspended, returning to execute the second thread when the flag is changed to the sleep state.

* * * * *